(12) United States Patent
Schaich

(10) Patent No.: US 11,953,155 B2
(45) Date of Patent: Apr. 9, 2024

(54) DEVICE FOR STORING COMPRESSED GAS, VEHICLE

(71) Applicant: Robert Bosch GmbH, Stuttgart (DE)

(72) Inventor: Udo Schaich, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 68 days.

(21) Appl. No.: 17/795,994

(22) PCT Filed: Dec. 28, 2020

(86) PCT No.: PCT/EP2020/087933
§ 371 (c)(1),
(2) Date: Jul. 28, 2022

(87) PCT Pub. No.: WO2021/151607
PCT Pub. Date: Aug. 5, 2021

(65) Prior Publication Data
US 2023/0075356 A1    Mar. 9, 2023

(30) Foreign Application Priority Data

Jan. 31, 2020   (DE) ..................... 10 2020 201 172.9

(51) Int. Cl.
*F17C 13/12*  (2006.01)
*B60K 15/03*  (2006.01)
*F17C 13/04*  (2006.01)

(52) U.S. Cl.
CPC ...... *F17C 13/123* (2013.01); *B60K 15/03006* (2013.01); *F17C 13/04* (2013.01);
(Continued)

(58) Field of Classification Search
CPC .............................. F17C 13/126; F17C 13/04
See application file for complete search history.

(56) References Cited

U.S. PATENT DOCUMENTS 3,029,981 A * 4/1962 Webster .................... F17C 1/00
116/DIG. 44
5,240,024 A * 8/1993 Moore .................... F17C 13/04
137/596.15

(Continued)

FOREIGN PATENT DOCUMENTS

DE        3835904 A1   4/1990
DE   102016004577 A1  10/2017

(Continued)

OTHER PUBLICATIONS

Translation of International Search Report for Application No. PCT/EP2020/087933 dated Mar. 26, 2021 (3 pages).

*Primary Examiner* — Umashankar Venkatesan
(74) *Attorney, Agent, or Firm* — Michael Best & Friedrich LLP

(57) ABSTRACT

The invention relates to a device for storing compressed gas, for example hydrogen or natural gas, comprising a storage line (1) to which at least one compressed gas container (2) is connected via a valve (3). According to the invention, the storage line (1) has at least one connection port (4) for the gas-tight connection of the at least one compressed gas container (2), and a safety element (5), which has a filter function and a shutoff function, is integrated in the connection port (4). The invention further relates to a vehicle having a device according to the invention for storing compressed gas.

19 Claims, 3 Drawing Sheets

(52) U.S. Cl.
CPC .............. *B60K 2015/03026* (2013.01); *B60K 2015/03315* (2013.01); *F17C 2205/0332* (2013.01); *F17C 2205/0335* (2013.01); *F17C 2205/0341* (2013.01); *F17C 2205/037* (2013.01); *F17C 2221/012* (2013.01); *F17C 2221/033* (2013.01); *F17C 2225/036* (2013.01); *F17C 2270/0178* (2013.01)

(56) References Cited

U.S. PATENT DOCUMENTS

| | | | | |
|---|---|---|---|---|
| 6,676,163 | B2* | 1/2004 | Joitescu | B60K 15/07 280/834 |
| 6,708,718 | B2* | 3/2004 | Yamada | F17C 13/045 137/263 |
| 8,522,597 | B2* | 9/2013 | Pechtold | H01M 8/04201 73/1.57 |
| 9,206,946 | B2* | 12/2015 | Mayr | F17C 13/002 |
| 11,271,225 | B2* | 3/2022 | Ham | H01M 8/065 |
| 11,662,064 | B2* | 5/2023 | Ehgartner | F17C 7/00 222/61 |
| 2002/0124883 | A1* | 9/2002 | Zheng | F17C 5/02 137/240 |
| 2010/0206402 | A1* | 8/2010 | Uchimura | F17C 13/04 137/511 |
| 2017/0050160 | A1* | 2/2017 | Yang | F17C 11/005 |
| 2021/0370222 | A1* | 12/2021 | Kanei | B01D 46/0036 |
| 2023/0053395 | A1* | 2/2023 | Graci | F17C 13/084 |
| 2023/0235830 | A1* | 7/2023 | Andreas | F16K 17/40 137/14 |

FOREIGN PATENT DOCUMENTS

| | | |
|---|---|---|
| DE | 102016008107 A1 | 1/2018 |
| DE | 102016214577 A1 | 2/2018 |
| DE | 102017004451 A1 | 11/2018 |
| DE | 102018000756 A1 | 1/2019 |
| DE | 102018206345 A1 | 10/2019 |
| EP | 0343615 A1 | 11/1989 |
| WO | 2012150180 A1 | 11/2012 |

* cited by examiner

DEVICE FOR STORING COMPRESSED GAS, VEHICLE

BACKGROUND

The invention relates to a device for storing compressed gas. The compressed gas can be, for example, hydrogen or natural gas, which is carried on board a vehicle for the purpose of supplying a fuel cell system or an internal combustion engine with the respective gas.

The invention furthermore relates to a vehicle having a device according to the invention.

In mobile applications, compressed gases are usually stored in a single compressed gas tank or in a plurality of compressed gas containers or compressed gas cylinders. For safety reasons, the leaktightness of the tank or cylinders must be ensured at all times. To reliably close compressed gas containers, use is therefore made of solenoid safety valves, which are closed in the deenergized state, thus reliably preventing gas escape even in the event of a fault. There may be a legal requirement for such a solenoid safety valve ("shutoff valve") to be provided for each compressed gas container and to be mounted directly on or in the container. The number of valves can thus increase rapidly, depending on the number of containers.

German Laid-Open Application DE 10 2017 004451 A1 discloses a storage device for compressed gas having a plurality of compressed gas containers, which are each connected to a common header volume via a tank valve and a line element.

The header volume, which can also be referred to as a "rail", reduces the outlay on piping. In addition, the header volume is extended inasmuch as valve devices which were previously present in the gas feed line or the gas discharge line are integrated into the header volume. This reduces the number of interfaces, which is advantageous with regard to problems associated with leaktightness. The integrated valve devices are preferably a check valve in the region of a gas feed line and a shutoff valve in the region of a gas discharge line. Since the pressure level in the header volume corresponds to the nominal pressure of the compressed gas containers, sealing with respect to the surrounding lines can be performed by means of the valve devices integrated into the header volume. The tank valves, via which the compressed gas containers are connected to the header volume, each have a refilling and a removal function.

SUMMARY

The underlying object of the present invention is that of developing a storage device of the abovementioned type in such a way that it satisfies increased safety requirements, for example in order to enable the use of compressed gas containers whose nominal pressure is 900 bar or more.

In order to achieve the object, the device according to the invention is proposed. Furthermore, a vehicle having a device according to the invention is specified.

The device proposed for storing compressed gas, for example hydrogen or natural gas, comprises a storage line, to which at least one compressed gas container is connected via a valve. According to the invention, the storage line has at least one connection piece for the gastight connection of the at least one compressed gas container. In addition, a safety element, which has a filter function and a shutoff function, is integrated into the connection piece.

The storage line of the proposed device has—inter alia—the advantages of the header volume of the prior art mentioned at the outset. This applies especially if more than one compressed gas container is connected to the storage line. This is because the outlay on piping can then be reduced by means of the common storage line. In addition, a solenoid safety valve ("shutoff valve") can be integrated into the common storage line, and therefore not every individual compressed gas container has to be equipped with a solenoid safety valve. If a tank function is integrated into the solenoid safety valve, it can be separated out and implemented at the other end of the storage line by an additional check valve unit. This measure makes it possible to use a solenoid safety valve which is less complex and requires smaller cross sections and/or magnetic forces. The valve via which the at least one compressed gas container is connected to the storage line can furthermore be designed as a simple passive or pressure-controlled valve.

In addition, the storage line of the device according to the invention has advantages which go beyond the prior art mentioned at the outset. For example, assembly is simplified by the at least one connection piece of the storage line. Moreover, the valve via which the at least one compressed gas container is connected to the storage line can be integrated into the connection piece. This reduces the number of interfaces or sealing points and also helps to save installation space.

Independently thereof, in the device according to the invention, at least one safety element, which has a filter function and a shutoff function, is integrated into the connection piece. By means of the proposed functional integration, the complexity of the device can be further reduced. At the same time, higher safety requirements can be met. The filter function counteracts the entry of harmful particles. The shutoff function provides an additional safety level, which is preferably activated in the event of danger, for example in the event of an impermissibly high temperature rise, which may be caused by a fire.

In a development of the invention, it is therefore proposed that the shutoff function of the safety element is thermally activatable. The shutoff function is preferably activated when the temperature rises above a certain critical value. The temperature rise may be caused by a simultaneous pressure rise in the system or from outside, for example by a fire. Because the shutoff function is thermally activatable, an additional actuator system can be dispensed with. This increases safety in the event of a fault or hazard.

According to a preferred embodiment of the invention, the safety element comprises a filter unit, which is accommodated in the connection piece in a manner such that it can be moved back and forth, is supported at its end facing away from the compressed gas container via a fusible ring and is held at an axial distance from a sealing seat integrated into the connection piece. This means that when the temperature rises above a critical value, that is to say above a value which is above the melting temperature of the fusible ring, the fusible ring begins to melt. The filter unit thus loses its abutment and the applied differential pressure presses the filter unit into the sealing seat. The filter unit closes the flow cross section in the connection piece via which compressed gas passes from the compressed gas container into the storage line, and therefore no further compressed gas can escape from the compressed gas container. This is because the pressure in the compressed gas container presses the filter unit into the sealing seat as long as the differential pressure at the filter unit remains built up.

The fusible ring is preferably produced from a metallic material, in particular from a metallic alloy, for example based on bismuth. The melting point of such materials is comparatively low, so that—in the event of a fire, for example—the fusible ring begins to melt after only a short time as a result of increased radiant heat. In the case of an alloy, the respective response point can be set via the alloy ratio. For example, the response or melting point can be about 130° C. to 140° C., resulting in a "low-melting alloy". It is important that the response or melting point of the fusible ring is below the respective melting points of the critical sealing and closing elements, thus enabling the protective function to take effect before compressed gas emerges in an uncontrolled manner.

Since critical sealing and/or closing elements of gastight valves are often manufactured from plastic, these may melt in the event of a fire and lose their function, in particular the sealing of the compressed gas container with respect to the outside. The melting point of polyether ether ketone (PEEK) is, for example, about 340° C., and that of polyamide is about 400° C. Ideally, therefore, a metallic material is chosen for the formation of the fusible ring, the melting point of which is below 300° C., furthermore preferably below 250° C. and particularly preferably below 200° C.

The fusible ring can be designed as a simple ring, which is preferably supported axially on an annular shoulder of the connection piece. The sealing seat for the filter unit is preferably formed by a further annular shoulder of the connection piece. When the fusible ring is present, the shoulder can be used to deflect the compressed gas flowing out of the compressed gas container. This is because the filter unit preferably has a hollow-cylindrical filter, into which the compressed gas flows axially from the compressed gas container. The compressed gas enters through the filter into an annular space which is delimited radially on the inside by the filter and radially on the outside by the connection piece. The filtrate is then passed via the annular space in the direction of the shoulder or sealing seat and deflected. Via radial bores in an end-located filter receptacle of the filter unit, the compressed gas is then directed back radially inward. The filter receptacle can simultaneously form a sealing surface cooperating with the sealing seat. The sealing surface is preferably arranged upstream of the radial bores, with the result that the latter are closed when the sealing surface comes to rest against the sealing seat.

It is furthermore proposed that the valve via which the compressed gas container is connected to the storage line is a flow limiting valve. The valve and the safety element are preferably connected in series and together form a shutoff valve as a further safety element. In this way, even higher safety requirements can be met. For example, the filter unit of the first safety element can serve as a sealing seat for a movable valve element of the flow limiting valve. For this purpose, the filter unit preferably has an annular filter receptacle arranged on the end. In order to keep the shutoff valve open in the normal case, a spring is preferably arranged between the filter unit and the valve element of the flow limiting valve. The shutoff valve is thus pressure-controlled. This means that when the pressure rises or when the flow rate rises above a certain critical value, the valve element is pressed into the sealing seat formed by the filter unit against the spring force of the spring and thus closes. Because of the differential pressure applied, the valve element is held in position until the pressure equilibrium is restored. If the compressed gas container were to tear off from the storage line, this would only be the case if the pressure in the compressed gas container corresponds approximately to the ambient pressure and another safety element was addressed.

By virtue of the fact that the safety element comprising the filter unit and the fusible ring, as well as the flow limiting valve, are connected in series, they can be integrated into the connection piece in a simple manner. To secure the position, a locking screw can be inserted or screwed into the connection piece after assembly. This preferably has a central throughflow opening to ensure that compressed gas passes from the connected compressed gas container into the connection piece and therefore into the storage line.

In particular, the at least one compressed gas container of the device according to the invention can be in the form of a cylinder. This means that the compressed gas container has at least one neck-shaped end section. The neck-shaped end section facilitates the gastight connection of the compressed gas container to the storage line since the diameter to be sealed is reduced.

The compressed gas container is preferably screwed onto the connection piece directly or indirectly via a preferably neck-shaped end section with the aid of a union nut. The screw connection not only simplifies gastight attachment but also permits simple disassembly of the compressed gas container if necessary, e.g. in order to replace a defective compressed gas container. If the compressed gas container is screwed directly onto the connection piece, the preferably neck-shaped end section has an internal thread, with which the compressed gas container is screwed onto an external thread of the connection piece. If a union nut is used, it is screwed onto the connection piece. Alternatively, any other type of fastening can be selected for the high-pressure-tight connection of the compressed gas container to the connection piece.

As a further preference, the compressed gas container has, in the region of a further, preferably neck-shaped end section, a closure body into which at least one further safety element is integrated. In particular, the closure body can be a closure screw, which is both easy to install and easy to remove. For this purpose, the closure screw preferably has an external thread and the preferably neck-shaped end section of the compressed gas container has an internal thread. The provision of at least one further safety element leads to a further increase in safety. Integration of the further safety element into the closure body enables it to be exchanged in a simple manner if required.

The at least one further safety element is preferably a vent valve with an integrated rupture disk and/or a temperature limiting valve. If two safety elements are provided, these are preferably arranged or connected in parallel, thus enabling them to perform their function independently of one another.

If a vent valve with a rupture disk is provided, the pressure of the compressed gas container is applied directly to the rupture disk. If the pressure rises above a critical value, the rupture disk breaks and exposes a venting cross section to the outside. The compressed gas present in the compressed gas container is discharged to the outside in a controlled manner in order to reduce pressure. Ideally, the vent valve is manually actuable, e.g. by being unscrewed, thus also enabling the compressed gas container to be depressurized manually. The flow rate can be reduced by means of a fixed restrictor, thus ensuring that it is in the non-critical range.

If a temperature limiting valve is provided, it opens when the temperature in the compressed gas container rises above a critical value. In this case, the valve opens and opens a cross section via which compressed gas can flow out of the compressed gas container, thus ensuring that pressure is reduced.

At least one shutoff element, which can preferably be actuated manually from the outside, for example in the form of a shutoff screw, is advantageously integrated into the storage line. The at least one shutoff element makes it possible to exchange an individual compressed gas container without having to empty the system. That is to say that the functionality is maintained if more than one compressed gas container is connected to the storage line. For this purpose, the shutoff element is preferably designed and placed in such a way that only one secondary path but not the main flow path of the storage line is interrupted. In order to be able to exchange each of the plurality of compressed gas containers when required, the number of shutoff elements preferably corresponds to the number of compressed gas containers, and therefore each compressed gas container is assigned a shutoff element, which is preferably manually actuable.

Furthermore, further components, such as temperature and/or pressure sensors, can be integrated into the storage line, in particular in the region of a connection piece. These can be sealed, attached and/or contacted in a simple and uncomplicated manner by means of the common storage line or rail.

Since the device according to the invention is preferably used in a mobile application, a vehicle having a device according to the invention is furthermore proposed. In this case, the compressed gas can be, in particular, hydrogen for operating a fuel cell system or an internal combustion engine. Furthermore, the compressed gas may be natural gas which is stored on board the vehicle with the aid of the device according to the invention for the purpose of operating an internal combustion engine.

BRIEF DESCRIPTION OF THE DRAWINGS

A preferred embodiment of the invention is explained in greater detail below with reference to the appended drawings. More specifically.

DETAILED DESCRIPTION

Figure 1:
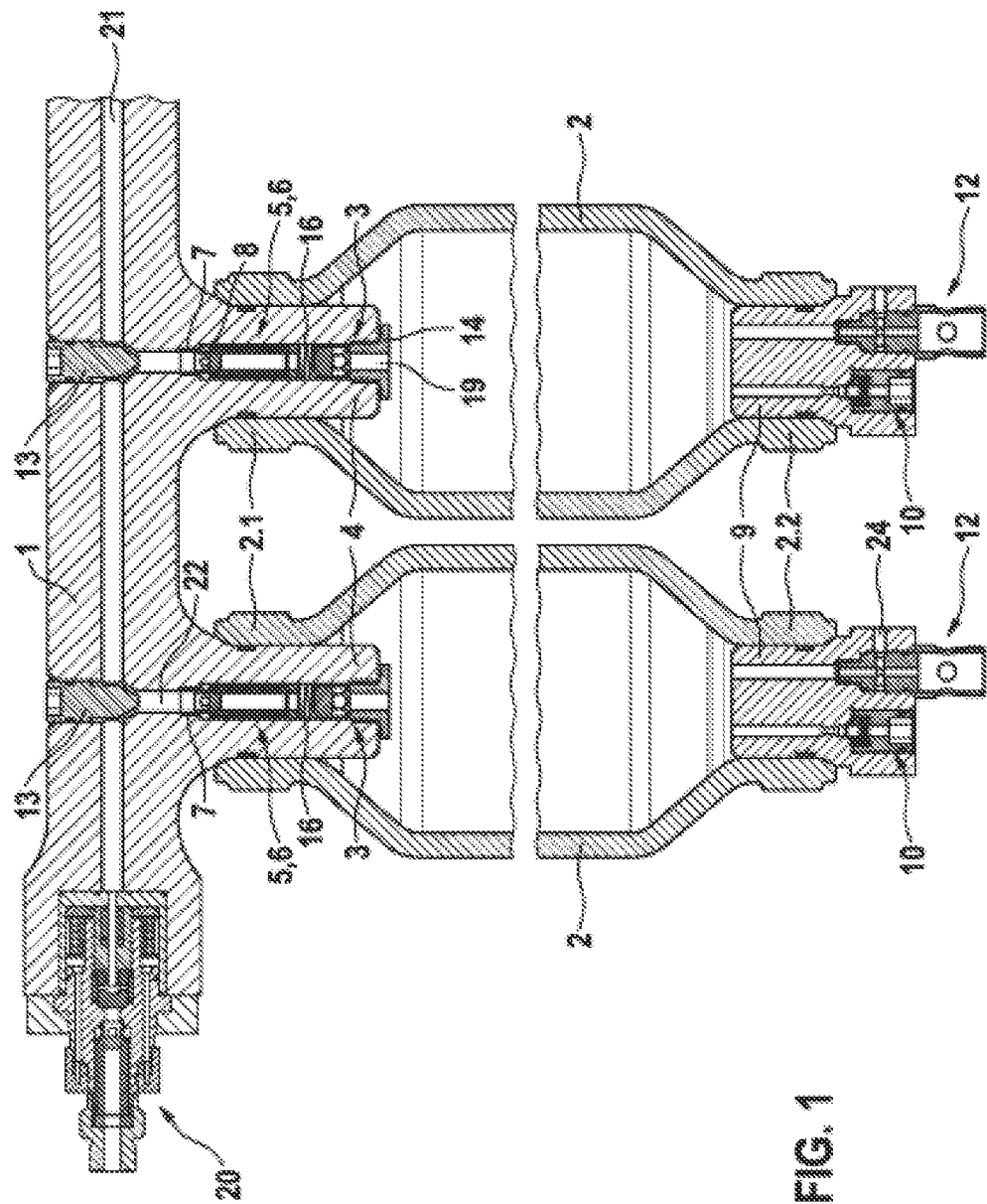
FIG. 1 shows a longitudinal section through a device according to the invention for storing compressed gas.

The device for storing compressed gas illustrated in FIG. 1 comprises a plurality of compressed gas containers 2 connected to a common storage line 1. FIG. 1 illustrates only two compressed gas containers 2 since the figure shows only part of the device. The device continues to the right in an analogous manner. The common storage line 1, which can also be referred to as a "rail", comprises a main line 21 and a plurality of branches 22. Via the branches 22, the contents of each compressed gas container 2 pass into the main line 21. The number of branches 22 therefore corresponds to the number of compressed gas containers 2. The branches 22 pass through connection pieces 4, onto which the compressed gas containers 2 are placed in a gastight manner, being screwed or pressed on, for example. For this purpose, each compressed gas container 2 has a neck-shaped end section 2.1, which can be connected nonpositively and/or positively to the respective connection piece 4, ensuring that the connection is high-pressure-tight. At the other end, each compressed gas container 2 has a further neck-shaped end section 2.2, into which a closure body 9, for example a closure screw, is inserted or screwed.

A solenoid safety valve 20 is integrated into the common storage line 1 or rail, more specifically in such a way that it can be used to shut off the main line 21. It is thus unnecessary to integrate a solenoid safety valve 20 into each of the compressed gas containers 2. Furthermore, manually actuable shutoff elements 13 for shutting off individual branches 22 are provided. Upon actuation, they shut off only the respective branch 22 but not the main line 21, and therefore functioning is otherwise maintained. This is advantageous, for example, if a single compressed gas container is to be exchanged.

Figure 2:
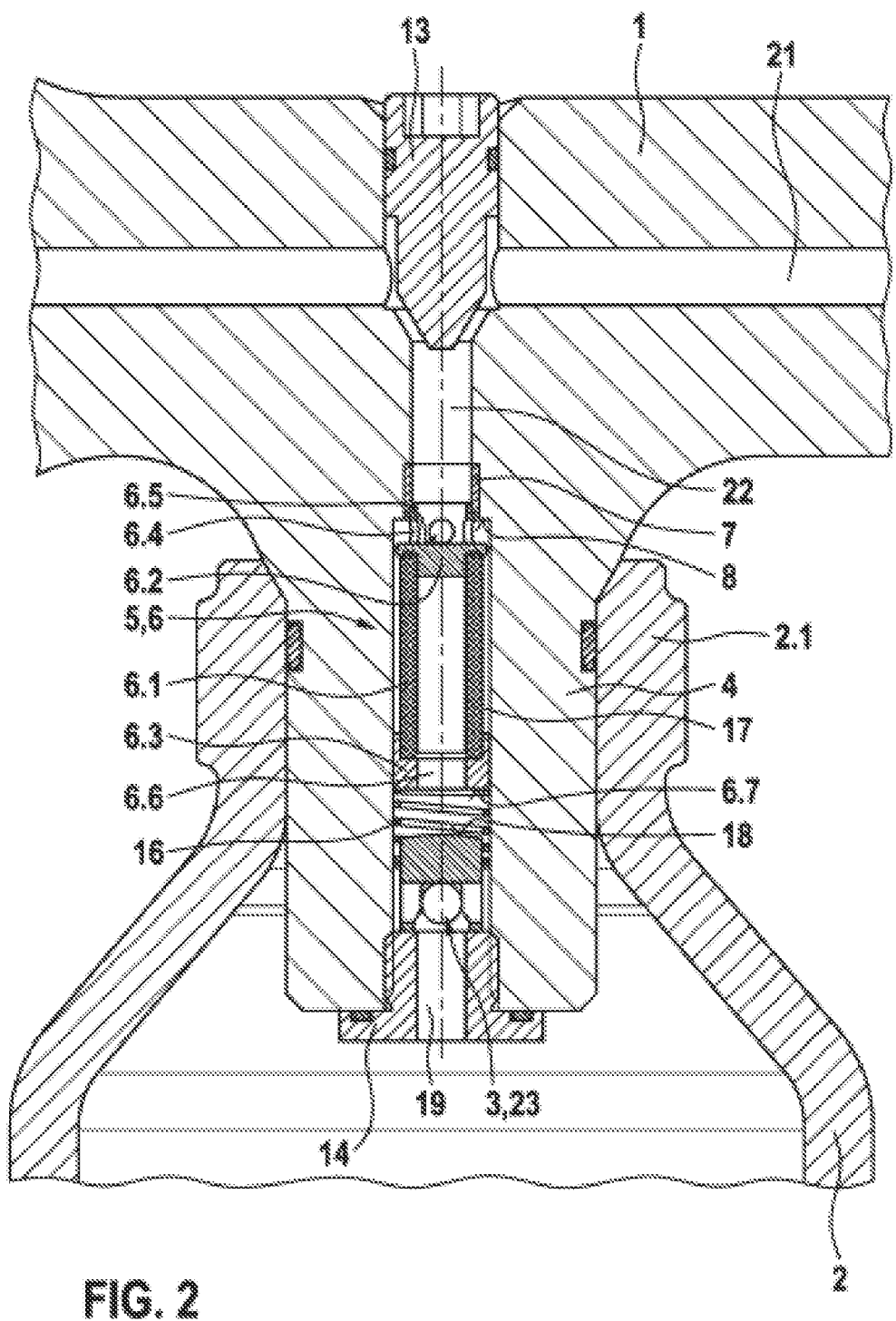
FIG. 2 shows an enlarged detail of FIG. 1 in the region of a first end section of a compressed gas container.

To explain the connection region of a compressed gas container 2 to the storage line 1, reference is made to FIG. 2, which shows this region in an enlarged illustration. It illustrates a section of the storage line 1 with a connection piece 4, onto which a compressed gas container 2 is screwed. In the present case, a safety element 5 and a valve 3, which in the present case interact to form a shutoff valve, are integrated into the connection piece 4 and the branch 22.

The safety element 5 comprises a filter unit 6, which is supported axially and held at a distance from a sealing seat 8 by means of a metallic fusible ring 7. The sealing seat 8 is formed by a shoulder of the connection piece 4. The filter unit 6 comprises a hollow-cylindrical filter 6.1, which is arranged between two filter receptacles 6.2, 6.3. The filter receptacle 6.2 facing the main line 21 forms a closure body, ensuring that compressed gas from the compressed gas container 2 is guided radially outward into an annular space 17 via the filter 6.1. In this case, any particles contained in the compressed gas are deposited on the inside of the filter. The filtrate passes via the annular space 17 to the shoulder of the connection piece 4 forming the sealing seat 8. Here, the gas flow is deflected and guided into the branch 22 via radial bores 6.4 formed in filter receptacle 6.2. The filter unit 6 thus performs a filtering or protective function. Owing to its support on the metallic fusible ring 7, it furthermore forms a thermally activatable safety element 5. This is because, when the temperature rises above a critical value, the fusible ring melts and the differential pressure acting on the filter unit 6 presses the latter into the sealing seat 8. During this process, a sealing surface 6.5 formed on filter receptacle 6.2 comes into contact with the shoulder of the connection piece 4 forming the sealing seat 8, ensuring that compressed gas can no longer escape from the compressed gas container 2 into the branch 22. The safety element 5 thus performs a filtering function and a shutoff function.

The valve 3, which is likewise integrated into the connection piece 4 and the branch 22, is connected upstream of the safety element 5 and is designed as a flow limiting valve. It has a movable valve element 23, which is held in an open position by the spring force of a spring 16, thus ensuring that compressed gas emerging from the compressed gas container 2 when the valve 3 is open flows around the valve element 23. If the flow rate rises above a critical value, the valve element 23 is moved counter to the spring force of the spring 16 in the direction of a sealing seat 6.7, which in the present case is formed by the filter receptacle 6.3 of the downstream filter unit 6. If a sealing surface 18 of the valve element 23 comes into contact with the sealing seat 6.7, the valve element 23 closes an inlet opening 6.6 of the filter receptacle 6.3, with the result that compressed gas no longer reaches the branch 22. Thus, the valve 3 and the filter unit 6 of the safety element 5 together form a shutoff valve or a further safety element 5.

In order to fix the position of the safety element 5 and of the valve 3 within the connection piece 4, a locking screw 14 with a central throughflow opening 19 is screwed into the end of said connection piece.

Each compressed gas container 2 of the device illustrated in FIG. 1 has further safety elements at its end facing away from the storage line 1. These are integrated into the closure body 9 or into the closure screw and are explained in more detail below with reference to FIG. 3.

Figure 3:
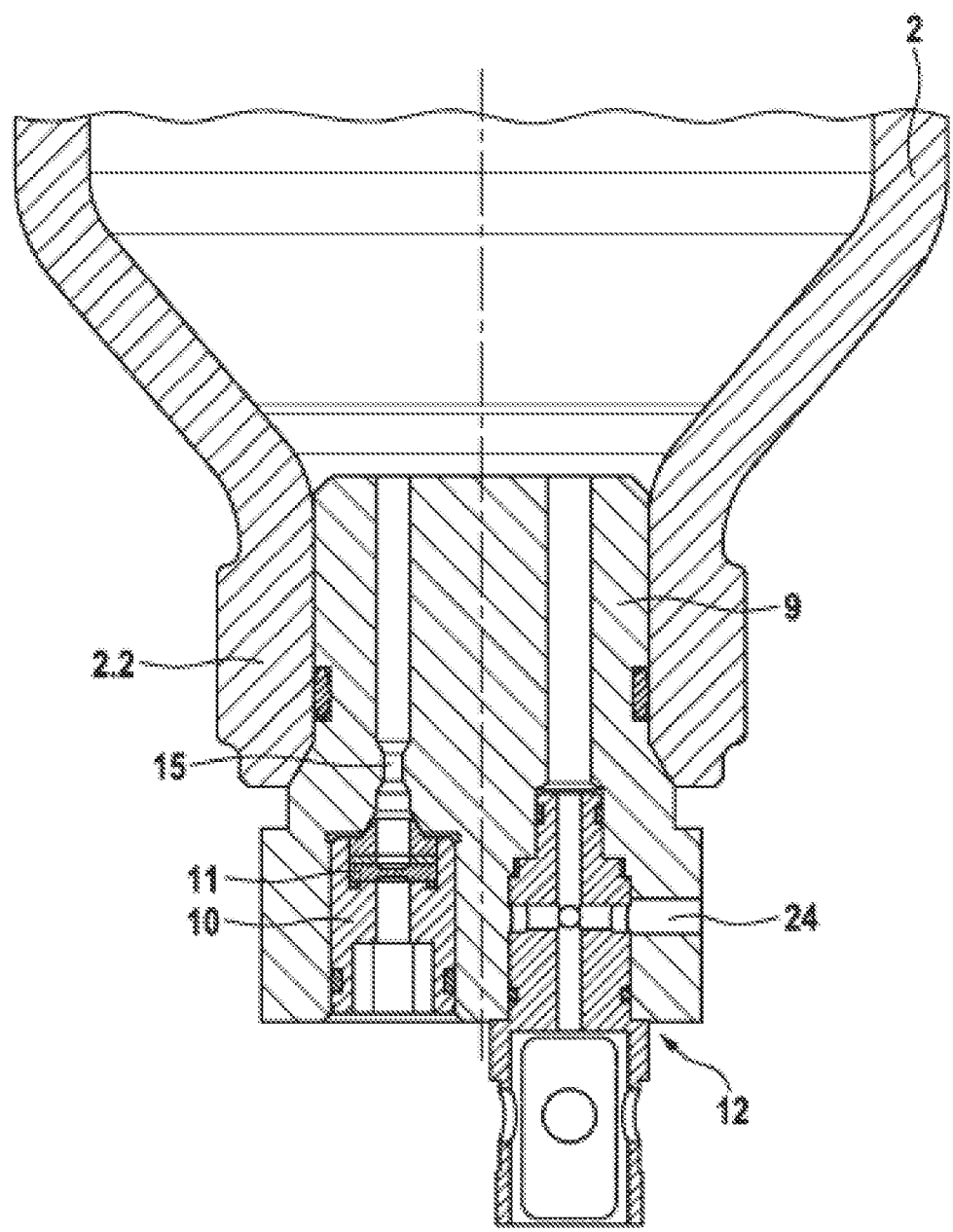
FIG. 3 shows an enlarged detail of FIG. 1 in the region of a second end section of a compressed gas container.

As can be seen from FIG. 3, a vent valve 10 with a rupture disk 11 is integrated into the closure body 9 as a further safety element. The rupture disk breaks and thus opens the vent valve 10 when the pressure in the compressed gas container 2 rises above a critical value. Compressed gas can then be discharged via the vent valve 10 and pressure can thus be reduced. In order to allow controlled discharge of compressed gas, a restrictor 15 is connected upstream of the vent valve 10.

In addition to or in parallel with the vent valve 10, a temperature limiting valve 12 is integrated into the closure body 9 as a further safety element. When a critical temperature is exceeded, this opens and exposes a relief bore 24, via which compressed gas can be discharged, thus ensuring that the pressure in the compressed gas container 2 falls.

The invention claimed is:

1. A device for storing compressed gas, the device comprising a storage line (1), to which at least one compressed gas container (2) is connected via a valve (3),
    wherein the storage line (1) has at least one connection piece (4) for a gastight connection of the at least one compressed gas container (2), wherein a safety element (5), which has a filter function and a shutoff function, is integrated into the connection piece (4), and wherein the safety element (5) comprises a filter unit (6), which is accommodated in the connection piece (4) in a manner such that it can be moved back and forth, is supported at its end facing away from the compressed gas container (2) via a fusible ring (7) and is held at an axial distance from a sealing seat (8) integrated into the connection piece (4).

2. The device as claimed in claim 1,
    wherein the shutoff function of the safety element (5) is thermally activatable.

3. The device as claimed in claim 1,
    wherein the fusible ring (7) is produced from a metallic material.

4. The device as claimed in claim 3, wherein the metallic material is a metallic alloy.

5. The device as claimed in claim 4, wherein the metallic alloy is based on bismuth.

6. The device as claimed in claim 3, wherein a melting point of the metallic material is below 300° C.

7. The device as claimed in claim 6, wherein the melting point of the metallic material is below 250° C.

8. The device as claimed in claim 7, wherein the melting point of the metallic material is below 200° C.

9. The device as claimed in claim 1,
    wherein the valve (3) via which the compressed gas container (2) is connected to the storage line (1) is a flow limiting valve, wherein the valve (3) and the safety element (5) are connected in series and together form a shutoff valve as a further safety element.

10. The device as claimed in claim 1,
    wherein the compressed gas container (2) is screwed onto the connection piece (4) directly or indirectly.

11. The device as claimed in claim 10, wherein the compressed gas container (2) is screwed onto the connection piece (4) directly or indirectly via a neck-shaped end section (2.1) and a union nut.

12. The device as claimed in claim 1,
    wherein the compressed gas container (2) has, in a region of a further end section (2.2), a closure body (9) into which at least one further safety element is integrated.

13. The device as claimed in claim 12,
    wherein the at least one further safety element is a vent valve (10) with an integrated rupture disk (11) and/or a temperature limiting valve (12).

14. The device as claimed in claim 12, wherein the closure body (9) is a closure screw.

15. The device as claimed in claim 12, wherein the further end section (2.2) is neck-shaped.

16. The device as claimed in claim 1,
    wherein at least one shutoff element (13) is integrated into the storage line (1) adjacent to an individual branch (22), and wherein the number of shutoff elements (13) corresponds to the number of compressed gas containers (2).

17. The device as claimed in claim 16, wherein the at least one shutoff element (13) is actuated manually and is in the form of a shutoff screw.

18. A vehicle having a device as claimed in claim 1, wherein the compressed gas is hydrogen or natural gas.

19. The device as claimed in claim 1, wherein the compressed gas is hydrogen or natural gas.

* * * * *